INVENTORS
EMIL HOPNER
DALE H. RUMBLE
BY John J. Goodwin
ATTORNEY 3,303,424

ASYNCHRONOUS DATA SYSTEM TRANSMITTING BEFORE EACH DATA PULSE A PULSE OF OPPOSITE POLARITY

Emil Hopner, Los Gatos, Calif., and Dale H. Rumble, Saugerties, N.Y., assignors to International Business Machines Corporation, New York, N.Y., a corporation of New York Filed July 3, 1963, Ser. No. 292,646
12 Claims. (Cl. 325—44)

Figure 1:
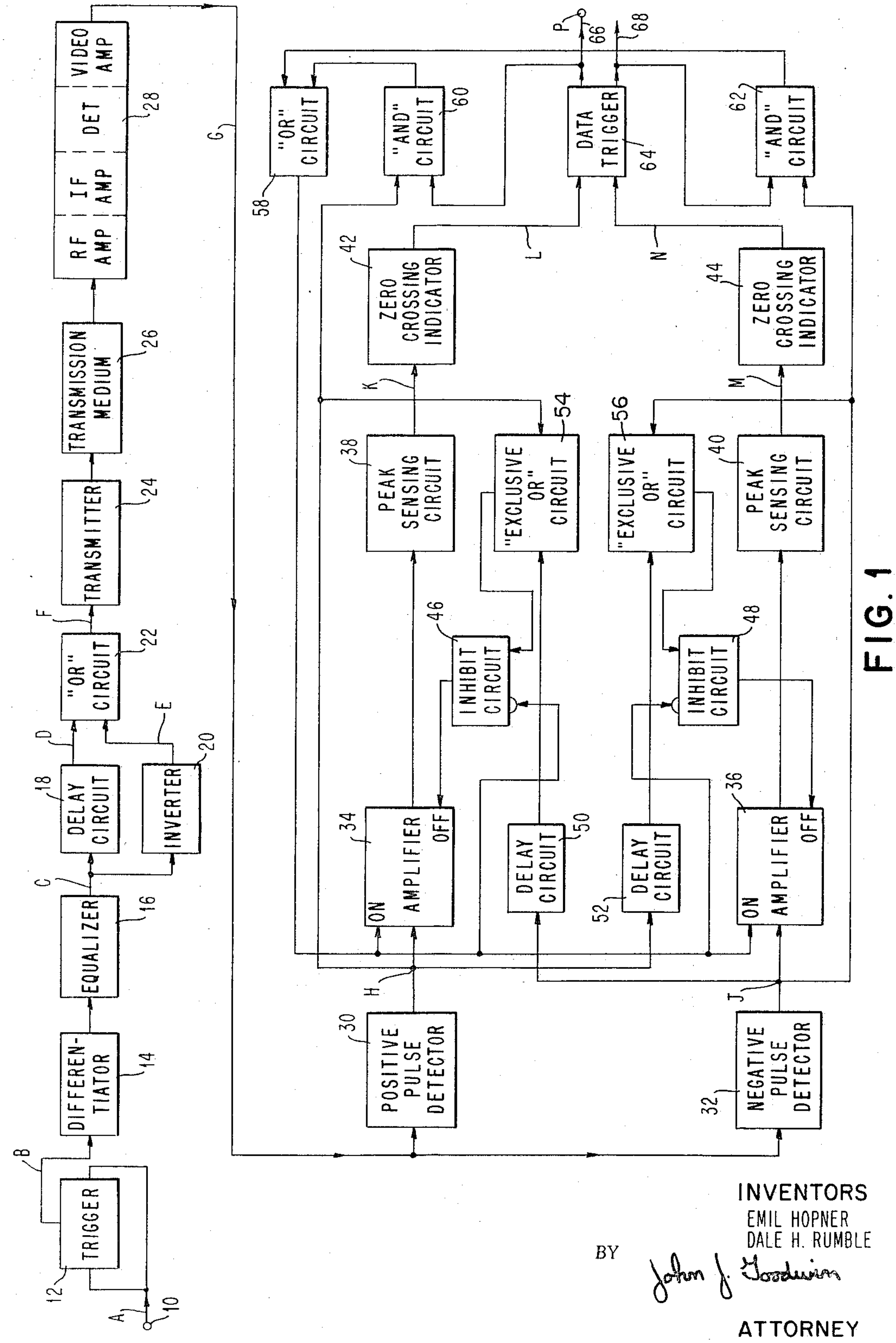

The present invention relates to high speed data transmission systems and more particularly to the transmission and retrieval of digital data between remote locations.

In an abandoned U.S. application Serial No. 213,227, filed July 30, 1962, and assigned to the same assignee as the present invention, a transmission system is described wherein digital data, in the form of pulse with modulated signals, are differentiated and the differentiated pulses are used to modulate a carrier signal prior to transmission. At the receiver, the transmitted signal is applied to a timed circuit which is tuned to the second harmonic of the received signal. The second harmonic signals are then used as clock signals. An important feature of the invention resides in the transmission of the data in the form of differentiated pulses, thereby eliminating the D.C. component of the original square wave signals in the transmitted signals. This permits the data to be transmitted via microwave carriers and commercially available television channels or any other non-continuous channel, without use of a baseband carrier.

The present invention relates to a transmission system which is similar to the cited co-pending application in that the transmitted signals are in the form of differentiated pulses, however, in the present system novel features are included which provide for asynchronous data handling that requires no demodulator clock.

One such feature is the inclusion of a pulse which precedes each transmitted data pulse and is of opposite polarity thereto for conditioning gating circuits at the receiver thereby indicating that each data pulse is imminent.

Another feature of the present invention is data retrieval by peak sensing the received signal and converting the corresponding peaks into zero crossings for driving an output trigger circuit, thereby avoiding the necessity of a receiver clock.

The elimination of the necessity for a demodulator clock is desirable for many reasons. For example, in the transmission of binary information of a start and stop nature, the present system permits the start of the transmission to begin at any time, not necessarily coincident with the bit time as is usually the case when a demodulator clock is employed for data retrieval. Also, when the binary information is indicative of pictorial data such as graphs or printed pages, the information is either black or white and does not include a grey scale. In such instances the changes between the black and white levels is a function of the pictorial data and may not be compatible with a demodulator clock. For such applications the present system, which allows the retrieval of asynchronous data without the use of a demodulator clock is extremely useful.

The other main feature of the invention, that of data retrieval by peak sensing the received signal and utilizing the peak indications for driving an output trigger circuit, is also useful. In many instances it is desirable to transmit binary data via channels which do not have the capability for transmitting direct current components of the data signals and which also introduce a frequency spectrum shift, for example telephone lines. In the prior art, systems for transmitting data via such channels commonly include a modem having a subcarrier oscillator for representing the direct current term and a receiver clock for retrieving the data. Channels such as telephone lines will produce a frequency spectrum shift of the subcarrier. The previously mentioned co-pending application Serial No. 213,227 describes a system wherein the data is transmitted in the form of differentiated pulses having no direct current term and therefore no necessity for a subcarrier oscillator. The present invention likewise employs such transmission in the form of differentiated pulses and therefore also does not employ a subcarrier oscillator. The absence of frequency spectrum shift in television channels and other broadband facilities allows the technique of peak sensing to be employed for retrieval of random data without the requirement of a clock.

An object of the present invention is to provide an improved digital data transmission system.

Another object of the present invention is to provide a digital data transmission system having gating pulses preceding the data pulses of the digital signal to condition a retrieval circuit to be responsive to the data pulses.

A further object of the present invention is to provide a digital random data transmission system which requires no receiver clock for data retrieving.

Still another object of the present invention is to provide a digital data transmission system wherein the transmitted signal contains discrete pulses and includes no direct current component.

A still further object of the present invention is to provide a digital data transmission system particularly adapted to microwave carriers.

The foregoing and other objects, features and advantages of the invention will be apparent from the following more particular description of a preferred embodiment of the invention, as illustrated in the accompanying drawings.

In the drawings:

FIG. 1 is a schematic block diagram of a data transmission system following the principles of the present invention.

FIG. 2A–P is an illustration of signal waveforms present at various points in the system of FIG. 1.

Referring to FIG. 1, the block diagram of an embodiment of the present invention is shown. The system includes an input terminal 10 connected to each of a pair of input leads of trigger 12 having an output coupled through a differentiating circuit 14 to an equalizer circuit 16. The output of equalizer 16 is applied both to a one bit delay circuit 18 and an inverter circuit 20. The outputs of both delay circuit 18 and inverter circuit 20 are connected through an "OR" circuit 22 to a transmitter 24 which may be of a conventional type including an RF modulator and an RF oscillator.

The output from transmitter 24 is coupled through a suitable transmission medium 26, for example, two microwave antennas or a coaxial cable. Coupled to transmission medium 26 is a conventional receiver section 28 including an RF amplifier, an IF amplifier, a detector and a video amplifier. The output from receiver 28 is applied to both a positive pulse detector 30 and a negative pulse detector 32. Pulse detectors 30 and 32 may be clipping circuits. The outputs from pulse detectors 30 and 32 are connected respectively to amplifiers 34 and 36. Amplifiers 34 and 36 are the type which may be turned "off" and "on" by selectively applied signals. The output of positive pulse detector 30 is also coupled to a delay circuit 52, an "EXCLUSIVE OR" circuit 54 and an "AND" circuit 60. The output of negative pulse detector 32 is also coupled to a delay circuit 50, and "EXCLUSIVE OR" circuit 56 and an "AND" circuit 62.

The output of delay circuit 50 is coupled to "EXCLUSIVE OR" circuit 54 and the output of delay circuit 52 is coupled to "EXCLUSIVE OR" circuit 56. The output of "EXCLUSIVE OR" circuit 54 is coupled to amplifier 34 such that a signal therefrom will turn amplifier 34 "off" and the output of "EXCLUSIVE OR" circuit 56 is coupled to amplifier 36 such that a signal therefrom will turn amplifier 36 "off."

The output of amplifiers 34 and 36 are respectively connected to peak sensing circuits 38 and 40 which may be differentiating circuits which are in turn respectively coupled to zero crossing indicator circuits 42 and 44. The output of zero crossing indicator circuit 42 is coupled to one input lead of data trigger 64 which switches trigger 64 into one state and zero crossing indicator circuit 44 is coupled to the other input lead of data trigger 64 and switches trigger 64 into the opposite state. A further pulse from either zero crossing indicator 42 or 44 when trigger 64 is already in the associated state will have no effect.

Data trigger 64 has two output leads 66 and 68. Output lead 66 is coupled to "AND" circuit 60 and output lead 68 is coupled to "AND" circuit 62. The outputs of "AND" circuits 60 and 62 are coupled to an "OR" circuit 58, the output of which is coupled to amplifiers 34 and 36 such that a signal from "OR" circuit 58 will turn amplifiers 34 and 36 "on."

The output of "OR" circuit 58 is also coupled to the inhibit terminals of inhibit gates 46 and 48. Thus an output signal from "OR" circuit 58 will prevent an output signal from either "EXCLUSIVE OR" circuit 54 or 56 occurring at the same time from turning amplifier 34 or 36 "off."

Figure 2:
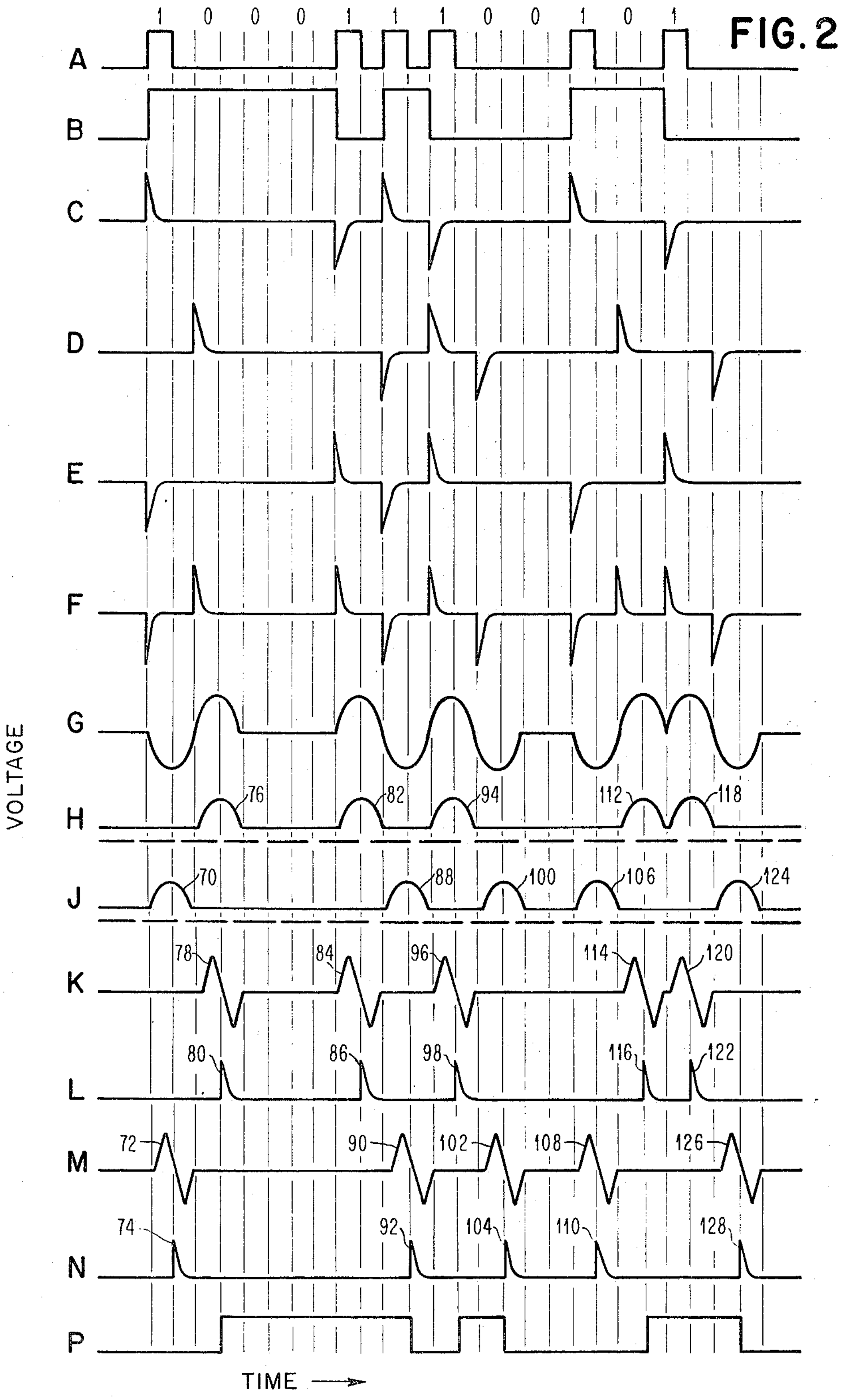

In order to understand the operation of the system illustrated in FIG. 1, reference is made to the signal waveforms shown in FIG. 2. The discrete pulses indicated at A of FIG. 2, each of which represents a "1" bit and which may have been received from a computer, are applied as input signals to terminal 10 of FIG. 1 to operate trigger 12 for producing at the output thereof the waveform B of FIG. 2. Each transition of the waveform B represents a "1" bit. It can be seen that when the first pulse of waveform A of FIG. 2 is applied to trigger 12, a transition occurs in the waveform B of FIG. 2 changing the voltage from a first or lower level to a second or upper level. Since "0" bits are not represented by a pulse, the waveform B remains at the upper level until the fifth bit or second "1" bit is applied to trigger 12 to produce a second transition which returns the voltage to the lower level. It can also be seen that the sixth, seventh, tenth and twelfth pulses representing "1" bits shown in waveform A of FIG. 2 produce successive transitions which are of alternate directions. Successive "1" bits will not produce transitions in the same direction in waveform B of FIG. 2.

The output of trigger 12 (waveform B) is applied to differentiating circuit 14 where alternate positive and negative sharp pulses are produced for each corresponding transition of waveform B. The output signal from differentiating circuit 14 is equalized by equalizer circuit 16 providing signals indicated by waveform C of FIG. 2.

The output signal from equalizer 16 is applied to delay circuit 18 where it is delayed for one bit period. The output signal from delay circuit 18 is depicted by waveform D of FIG. 2. The output signal from equalizer circuit 16 is also applied to inverter circuit 20 where the polarity of each pulse is reversed. The output signal from inverter circuit 20 is shown by waveform E of FIG. 2. The signals from delay circuit 18 and inverter circuit 20 are applied to "OR" circuit 22 and result in an output signal therefrom as shown by waveform F of FIG. 2. As seen from waveform F, successive "1" bits are represented by alternate polarity pulses and each such data pulse is accompanied by an opposite polarity pulse one bit period in advance. As will be later described the pulses which precede each data pulse and which will be hereinafter referred to as gate pulses are employed at the receiver to condition a gate such that the succeeding opposite polarity data pulse will be accepted.

The output signal from "OR" circuit 22 is then applied to transmitter 24 where it modulates the carrier or oscillator therein. The modulated signal from transmitter 24 passes through transmission medium 26 to receiver section 28 in which it is amplified and detected in a known manner to produce a signal at the output of receiver section 28 as shown by waveform G of FIG. 2. It can be seen that the positive and negative excursions in the waveform G in FIG. 2 correspond to the positive and negative excursions shown in the waveform F. Whereas the positive and negative excursions of waveform F form sharp pulses, the positive and negative excursions of waveform G approximate one-half of a sine wave. The sinusoidal form is produced due to the restricted bandwidth of the transmission channel which does not permit all the original modulation products to be transmitted.

The output signal from receiver section 23 as shown by waveform G of FIG. 2 is applied to positive and negative pulse detectors 30 and 32 which are designed to pass only the upper portions of the positive and negative sinusoidal type pulses of waveform G in order to minimize errors due to noise. The peaks of the positive pulses passing through pulse detector 30 are shown at waveform H of FIG. 2 and the peaks of the negative pulses passing through pulse detector 32 are shown at waveform J of FIG. 2. Positive pulse detector 30 includes a clipping circuit and negative pulse detector 32 includes a clipping circuit followed by a phase inversion stage so that the negative peaks of waveform G of FIG. 2 appear as positive peaks at the output of pulse detector 32 as shown by waveform J of FIG. 2.

The signal from positive pulse detector 30 depicted at waveform H of FIG. 2 is applied to amplifier 34, "AND" circuit 60 and "EXCLUSIVE OR" circuit 54 and the signal from negative pulse detector 32 depicted at waveform J of FIG. 2 is applied to amplifier 36, "AND" circuit 62 and "EXCLUSIVE OR" circuit 56. Amplifiers 34 and 36 may be turned "on" and "off" by selectively applied signals. Amplifiers 34 and 36 are turned "on" by an output signal from "OR" circuit 58; amplifier 34 is turned "off" by an output signal from "EXCLUSIVE OR" circuit 54, and amplifier 36 is turned "off" by an output signal from "EXCLUSIVE OR" circuit 56. Amplifiers 34 and 36 also serve to return the output signals from pulse detectors 30 and 32 (waveforms H and J, FIG. 2) to the original lower reference level. The data trigger 64 is a two state device with output leads 66 and 68 having signals thereon either in a first or lower level or a second or upper level when the signal on lead 66 is "up" the signal on lead 68 is down and vice-versa.

Normally, before reception of a transmitted signal, amplifiers 34 and 36 are "on," the signal on lead 66 is at the lower level and the signal on lead 68 is at the upper level.

When transmission begins, the first change in transmitted signal level will be upon the first occurrence of a "1" bit which is manifested by a positive excursion. However, in the present invention the positive excursion of the transmitted signal due to the occurrence of the "1" bit is preceded by a negative excursion due to the gating bit added at "OR" circuit 22. Thus, referring to waveform G of FIG. 2, the first signal excursion received after transmission begins is negative. This negative excursion is passed through negative pulse detector 32 and appears as a positive pulse 70 at waveform J of FIG. 2.

Pulse 70 is applied to "EXCLUSIVE OR" circuit 56 and will produce an output signal therefrom. However pulse 70 is also applied to "AND" circuit 62 where it is gated due to the signal on output lead 68 being at the upper level. The output signal from "AND" circuit 62 passes through "OR" circuit 58 and is applied as an inhibit signal to inhibit circuit 48, thereby preventing the output signal from "EXCLUSIVE OR" circuit 56 from turning off amplifier 36.

Pulse 70 passes through amplifier 36 and is applied to peak sensing circuit 40, which may be a differentiating circuit. Differentiation of pulse 70 is a peak sensing function in that the output signal by the differentiation of pulse 70 in circuit 40 provides a zero crossing at the point when pulse 70 of waveform J of FIG. 2 reached a peak. Pulse 72 of waveform M of FIG. 2 illustrates the output signal produced by peak sensing circuit 40 in response to pulse 70 of waveform J of FIG. 2 being applied thereto. It is noted that the zero crossing of pulse 72 coincides with the peak of pulse 70.

Pulse 72 of waveform M of FIG. 2 (the output signal from peak sensing circuit 40) is applied to a zero crossing indicator circuit 44 which produces a positive output pulse when signal 72 of waveform M crosses the zero axis. The output pulse produced by zero crossing indicator 44 as a result of signal 72 of waveform M is shown as pulse 74 of waveform N of FIG. 2. Output pulse 74 (FIG. 2) from zero crossing indicator 44 is applied to data trigger 64. However, the state of trigger 64 is such that the output signal on lead 66 is at the lower level and the output signal on lead 68 is already at the upper level, and pulse 74 (FIG. 2) from zero crossing indicator 44 does not switch trigger 64.

Pulse 70 (waveform J, FIG. 2) at the output of negative pulse detector 32 is also applied to delay circuit 50 where it is delayed slightly longer than one pulse period.

Immediately following the occurrence of pulse 70, pulse 76 (waveform H, FIG. 2) is produced at the output of positive pulse detector 30. Pulse 76 is applied to "EXCLUSIVE OR" circuit 54, however no output signal is produced therefrom due to the fact that the preceding pulse 70 of waveform J was applied to delay circuit 50 where it was delayed approximately 1.1 bit periods and is now present at the other input of "EXCLUSIVE OR" circuit 54. The delay time of circuits 50 and 52 was selected to be 1.1 bit periods to account for the fact that the pulses of waveforms H and J of FIG. 2 do not occupy a full bit period in that only the peak portions of the pulses of waveform G of FIG. 2 are passed by pulse detectors 30 and 32. Thus, pulse 70 of waveform J of FIG. 2 must be delayed slightly greater than one bit period to become time coincident with pulse 76 of waveform H of FIG. 2.

There being no output signal from "EXCLUSIVE OR" circuit 54, amplifier 34 remains "on" and pulse 76 is passed therethrough and applied to peak sensing circuit 38 such as a differentiating circuit where it is differentiated to produce the signal 78 of waveform K of FIG. 2. The output signal from peak sensing circuit 38 is applied to zero crossing indicator circuit 42 which produces an output pulse 80 as shown at waveform L of FIG. 2. The output pulse 80 from zero crossing indicator circuit 42 is applied to data trigger 64 and causes switching such that the signal on output lead 66 is switched to the upper level and the output signal on lead 68 is switched to the lower level. The output signal on lead 66 is shown at waveform P of FIG. 2.

Pulse 76 of waveform H of FIG. 2 was also applied to "AND" circuit 60, but the signal on lead 66 having been at the lower level, no gating occurred. Pulse 76 is also applied to delay circuit 52.

It is noted that pulse 70 of waveform J of FIG. 2 was a gating pulse which did not switch the data trigger but did provide a delayed signal to permit data pulse 76 to pass through amplifier 34 and switch trigger 64, providing an indication on output lead 66 that a "1" bit occurred.

Succeeding pulse 76 there is no pulse output from either positive pulse detector 30 or 32. The delayed pulse 76 in delay circuit 52 is now applied to "EXCLUSIVE OR" circuit 56 which in turn produces an output signal which turns amplifier 36 "off." It is noted that the initial "1" bit was manifested by a data pulse at the output of positive pulse detector 30. Thus the next "1" bit will be manifested by an opposite polarity pulse which will result in a data at the output of negative pulse detector 32. The data pulse which will appear at the output of negative pulse detector 32 will, however, be immediately preceded by an opposite polarity gate pulse which appears at the output of positive pulse detector 30. Thus, amplifier 36 is turned "off" until such time as the next gate pulse appears at the output of positive pulse detector 30, at which time amplifier 36 is turned "on." Thus, any extraneous noise signals which may occur in the interim will not be able to pass through "off" amplifier 36 and erroneously switch data trigger 64.

The next pulse which occurs is pulse 82 of waveform H of FIG. 2 at the output of positive pulse detector 30. Pulse 82 is applied to "EXCLUSIVE OR" circuit 54, however it is also gated through "AND" circuit 60 because the signal on output lead 66 is at the upper level and produces an output signal from "OR" circuit 58 which inhibits the output signal from "EXCLUSIVE OR" circuit 54 by means of inhibit circuit 46, and amplifier 34 remains "on." Note also that the output signal from "OR" circuit 58 also turns amplifier 36 "on." Pulse 82 from positive pulse detector 30 passes through amplifier 34 and peak sensing circuit 38 resulting in signal 84 of waveform K, FIG. 2. Signal 84, when applied to zero crossing indicator circuit 42 results in pulse 86 of waveform L, FIG. 2 which, when applied to data trigger 64, has no effect as the signal on lead 66 is already at the upper level. Pulse 82 from positive pulse detector 30 is also applied to delay circuit 52.

The next occurring pulse is pulse 88 of waveform J of FIG. 2 which appears at the output of negative pulse detector 32. Pulse 88 (FIG. 2) is applied to "EXCLUSIVE OR" circuit 56 coincident in time with delayed pulse 82 (FIG. 2) from delay circuit 52, resulting in no output signal from "EXCLUSIVE OR" circuit 56 and therefore amplifier 36 remains "on." Pulse 88 (FIG. 2) is also applied to delay circuit 50 and to "AND" circuit 62, however, the signal on lead 68 being at the lower level, no output is produced from "AND" circuit 62. Pulse 88 (FIG. 2) is passed through amplifier 36 to peak sensing 40 where it is differentiated to produce a signal 90 (waveform M, FIG. 2) and then to zero crossing indicator circuit 44 which produces a pulse 92 (waveform N, FIG. 2) which, when applied to data trigger 64, cause switching. The output signal on lead 66 is switched to the lower level and the output on lead 68 is switched to the upper level. Note the waveform of the signal on lead 66 as shown by waveform P of FIG. 2.

Pulse 88 had been applied to delay circuit 50 and would ordinarily serve to switch amplifier 34 "off" in the absence of any successive pulses. However, it is possible that another "1" bit will occur and will result in an output pulse from positive pulse detector 30. Such instance will be described with pulse 94 of waveform H, FIG. 2 representing the data bit. Pulse 94 is applied to "EXCLUSIVE OR" circuit 54 coincident in time with the delayed pulse 88 at the output of delay circuit 50 and therefore no output signal results from "EXCLUSIVE OR" circuit 54 and amplifier 34 remains "on." Pulse 94 is also applied to delay circuit 52 and "AND" circuit 60.

The signal on output lead 66 is in the lower level so pulse 94 is not gated through "AND" circuit 60. Pulse 94 will pass through amplifier 34 and differentiator 38 to produce the signal 96 (waveform K, FIG. 2) which in turn results in pulse 98 (waveform L, FIG. 2) which switches data trigger 64, placing output lead 66 at the upper level and lead 68 at the lower level. Note waveform P, FIG. 2.

Pulse 94 having been applied to delay circuit 52, the amplifier 36 will ordinarily be turned "off" at the next pulse period unless another "1" bit is present in that pulse period. Referring to waveform A, FIG. 2, it is seen that this is the case, and the next succeeding pulse appears at the output of negative pulse detector 32.

The next occurring pulse is pulse 100 (waveform J of FIG. 2) which appears at the output of negative pulse detector 32. Pulse 100 is applied to delay circuit 50, amplifier 36, "EXCLUSIVE OR" circuit 56, and "AND" circuit 62. Lead 68 is at the lower level so that pulse 100 cannot be gated through "AND" circuit 62. However amplifier 36 is still in the "on" state. "EXCLUSIVE OR" circuit 56 produces no output since pulse 100 and delayed pulse 94 from delay circuit 52 are both present as inputs, therefore amplifier 36 remains "on." Pulse 100 is passed through amplifier 36 and produces an output signal 102 (waveform M, FIG. 2) from peak sensing circuit 40 and a pulse 104 (waveform N, FIG. 2) from zero crossing indicator 44 which will in turn switch data trigger 64 such that the signal on output lead 66 is at the lower level and the signal on lead 68 is at the upper level. Note waveform P, FIG. 2.

It is to be noted that in the event of two or more successive "1" bits, the opposite polarity gating pulses which immediately precede each of the data pulses become merged with the preceding "1" bit data pulse and do not effect the sequence of operation of the data trigger 64.

From waveform A, FIG. 2, it is seen that the next bit is a "0" bit and therefore there is no pulse at the output of either positive pulse detector 30 or negative pulse detector 32 immediately after the occurrence of pulse 100 from pulse detector 32. Pulse 100, having been delayed by delay circuit 50, now is applied to "EXCLUSIVE OR" circuit 54 which in turn produces an output signal which turns amplifier 34 "off." Thus no noise signals will pass through amplifier 34 and erroneously switch data trigger 54.

The next occurring pulse 106 (waveform J, FIG. 2) appears at the output of negative pulse detector 32. Pulse 106 will be gated through "AND" circuit 62 as the signal on lead 68 is at the upper level. The output signal from "AND" circuit 62 is passed through "OR" circuit 58 and turns amplifier 34 "on." Pulse 106 is also applied to "EXCLUSIVE OR" circuit 56, however the output signal from "OR" circuit 58 is applied to the inhibit terminal of inhibit circuit 48 to prevent the output signal from "EXCLUSIVE OR" circuit 56 from turning amplifier 36 "off."

Pulse 106 is passed through amplifier 36 and peak sensing circuit 40 to produce signal 108, waveform M, FIG. 2, which, when passed through zero crossing circuit 44, produces pulse 110, waveform N, FIG. 2. Pulse 110 is applied to data trigger 64 but does not cause switching since the signal on lead 68 is already at the upper level. Pulse 106 is also applied to delay circuit 50.

Thus far it has been described how, if a data pulse occurs and is not immediately followed by a gating pulse or another data pulse, the one of the amplifiers 34 or 36 will turn "off" to prevent noise from switching data trigger 54 until the reception of the next gating pulse. It was also explained how, if a data pulse is immediately followed by another data pulse the one of the amplifiers 34 or 36 will remain on and permit such following data pulse to reach data trigger 54 with the gating pulse associated with such following data pulse being merged with the preceding data pulse.

The third instance, that wherein a data pulse is followed by the gating pulse of the next succeeding data pulse will now be described.

The next occurring pulse is pulse 112 (waveform H, FIG. 2) which immediately succeeds pulse 106 and appears at the output of positive pulse detector 30. At this time, amplifier 34 is "on," the signal on output lead 66 is at the down lower level disabling "AND" circuit 60 and a signal (delayed pulse 106) is present at the output of delay circuit 50 disabling "EXCLUSIVE OR" circuit 54 so that pulse 112 is applied to delay circuit 52 and passed through amplifier 34 to peak sensing circuit 38 where it is differentiated to produce signal 114 (waveform K, FIG. 2) and pulse 116 (waveform L, FIG. 2) which switches data trigger 64 to raise the signal on output lead 66 to the upper level and place the signal on lead 68 at the lower level. Note the signal on lead 66 as shown at waveform P, FIG. 2.

This next gating pulse, pulse 118 (waveform H, FIG. 2) immediately appears following pulse 112 also at the output of positive pulse detector 30 and is applied to delay circuit 52, "EXCLUSIVE OR" circuit 54, amplifier 34 and "AND" circuit 60. At this time pulse 118 will be gated through "AND" circuit 60 and "OR" circuit 58 because the signal on output lead 66 is at the upper level and an "on" signal will be applied to amplifiers 34 and 36 (which are already "on"). However, the signal from "OR" circuit 58 is also applied to the inhibit terminal of inhibit gate 48 to prevent the output signal from "EXCLUSIVE OR" circuit (produced by delayed pulse 112 from delay circuit 52) from turning amplifier 36 "off."

Pulse 118 is also passed through amplifier 34 (the output signal from "OR" circuit 58 also inhibiting the output signal from "EXCLUSIVE OR" circuit 54) and produces a signal 120 (waveform K, FIG. 2) from peak sensing circuit 38 and pulse 122 (waveform L, FIG. 2) from zero crossing circuit 42. Pulse 122 does not switch trigger 64 since output lead 66 is already at the upper level.

The next pulse immediately following gating pulse 118 is data pulse 124 (waveform J, FIG. 2) which appears at the output of negative pulse detector 32. Amplifier 36 is "on" and since delayed pulse 118 from delay circuit 52 is present at the output of "EXCLUSIVE OR" circuit 56, amplifier 36 remains "on." Pulse 124 is passed through amplifier 36, peak sensing circuit 40 (producing signal 110, waveform M, FIG. 2) and zero crossing detector 44 (producing pulse 126, waveform N, FIG. 2) and switches data trigger 64 to place the signal on output lead 66 at the lower level and the signal on lead 68 at the upper level. See waveform P, FIG. 2.

Comparing the output signal on lead 66 (waveform P) with the pulse width modulated data signal (waveform B) it is seen that they are identical.

Pulse 124 is also applied to delay circuit 50 so that in the absence of a pulse in the next succeeding pulse period amplifier 34 will be turned "off." If either a gating pulse or a data pulse occurs in the next succeeding pulse period, the circuit will operate as described hereinabove.

What has been described is a transmission system wherein pulse width modulated binary information is transmitted in the form of sharp pulses. At the transmitter a gating pulse is included preceding each data pulse having a polarity opposite to that of the data pulse. By means of logic circuits at the receiver, the data trigger is disconnected from the input of the receiver at the times when no data pulses are present and is connected to the input of the receiver only at the times when a data pulse is present, thus reducing the possibility of error due to noise or other extraneous pulses. Generally, as seen from the discussion, a gating pulse indicates that there will be an immediately following data pulse of opposite polarity and establishes the necessary gating conditions such that the data pulse is applied to the data trigger circuit. In addition, the logic circuits are also designed to operate properly even when a gating pulse occurs simultaneously with a data pulse, as in the case when a plurality of consecutive "1" bits occur. Note that in FIG. 2 a gating pulse and a data pulse were simultaneously present in the sixth and the seventh bit positions as seen from data pulse waveform D and gating pulse waveform E and result in a single pulse in the sixth and seventh bit positions of the transmitted signal waveform F. The logic circuits are designed such that this apparent ambiguity is overcome and the correct pulse width modulated data signal is retrieved and appears as signal waveform P on output lead 66.

The means for the data retrieval is unique in that random data may be retrieved without the necessity of a clocking signal or clock circuit. This is accomplished, as seen from the discussion, by peak sensing the detected signal by means of a differentiator, for example, and the zero crossings produced by such differentiation are converted to set and reset signals for a data trigger circuit.

The technique of peak sensing as described in the present invention may also be employed in data transmission systems wherein the data is synchronous and includes a grey scale. The technique of peak sensing, used in conjunction with a clock, will provide, in measuring the time between the peaks and the bit periods, the grey scale an indication of the degree of "greyness" of the picture spot.

While the invention has been particularly shown and described with reference to a preferred embodiment thereof, it will be understood by those skilled in the art that various changes in form and details may be made therein without departing from the spirit and scope of the invention.

What is claimed is:

1. A data transmission system comprising:

a source of digital data signals, said digital data being manifested by seriately occurring alternate polarity data pulses, means coupled to said source for delaying each of said data pulses a fixed time period, means coupled to said source for inverting the polarities of each of said data pulses to form gating pulses, means for combining said delayed data pulses and said gating pulses to form a composite signal wherein each of said data pulses are preceded at said fixed time period by an opposite polarity pulse, means for receiving said composite signal including, bistable means for producing an output signal which alternates between a first and second signal level in response to input pulses applied thereto, and switching means disposed between said receiving means and said bistable means for selectively coupling said composite signal to said bistable means at predetermined times such that said bistable means changes output signal levels only in response to said data pulses.

2. A data transmission system according to claim 1 wherein said bistable means includes first and second input leads, said output signal thereof changing levels in response to pulses alternatively applied to said first and second input leads, and wherein said switching means includes means responsive to said composite signal for separating the pulses thereof having a first polarity into a first channel and the pulses thereof having a second polarity into a second channel and means for selectively coupling said first channel to said first input lead of said bistable means and said second channel to said second input lead of said bistable means.

3. A data transmission system comprising:

a source of binary signals, means responsive to said source of binary signals for providing an output signal which alternates between first and second signal levels in responsive to "1" bit binary signals from said source, means for differentiating said output signal from said responsive means for producing a data signal wherein said "1" bits are manifested by seriately occurring polarity data pulses of alternate first and second polarities, means coupled to said differentiating means for delaying each of said data pulses one bit period, means coupled to said differentiating means for inverting the polarities of each of said data pulses to form gating pulses, means for combining said delayed data pulses and said gating pulses to form a composite signal wherein each of said delayed alternate polarity data pulses are preceded by one bit period by an opposite polarity pulse, and means for transmitting said composite signal via a suitable transmission medium.

4. A data transmission system according to claim 3 further including means for receiving said transmitted composite signal, bistable means for producing an output signal which alternates between a first and second signal level in response to input pulses applied thereto, said bistable means including first and second input leads, said output signal thereof changing signal levels in response to input signals applied alternately to said first and second input leads, means coupled to said receiving means for separating the first polarity pulses of said composite signal onto a first output lead and said second polarity pulses thereof onto a second output lead, first switching means for selectively coupling said first output lead of said separating means to said first input lead of said bistable means, second switching means for selectively coupling said second output lead of said separating means to said second input lead of said bistable means, said bistable means being responsive to said first and second polarity data pulses of said composite signal selectively coupled to said first and second input leads thereof for producing an output signal which alternates between said first and second signal levels in the same manner as said output signal of said means responsive to said source of binary signal.

5. A data transmission system comprising:

a source of binary signal wherein "0" bits are manifested by a given signal level and "1" bits are manifested by alternate first and second polarity pulsed excursions from said given signal level, means coupled to said source for delaying each of said alternate first and second polarity pulses one bit period, means coupled to said source for inverting said alternate first and second polarity pulses to form gating pulses, means for combining said delayed pulses and said gating pulses to form a composite signal wherein said alternate first and second polarity "1" bit pulses are preceded by one bit period by an opposite polarity pulse, means for transmitting said composite signal via a suitable transmission medium, means for receiving said transmitted composite signal, bistable means for producing an output signal which alternates between a first and second signal level in response to input pulses applied thereto, said bistable means including first and second input leads, said output signal thereof changing signal levels in response to input signals applied alternately to said first and second input leads, means coupled to said receiving means for separating said pulses of said composite signal of said first polarity onto a first output lead and said pulses of said composite signal of said second polarity onto a second output lead, first switching means for selectively coupling said first output lead of said separating means to said first input lead of said bistable means, second switching means for selectively coupling said second output lead of said separating means to said second input lead of said bistable means, control means coupled to said separating means and said first and second switching means for controlling the selective coupling of said first and second switching means, said control means operating to disconnect said first output lead of said separating means from said first input lead of said bistable means upon the occurrence of a "1" bit pulse of said second polarity succeeded by a "0" bit signal and to reconnect said first output lead of said separating means to said first input lead of said bistable means upon the next occurrence of a pulse of said first polarity succeeding said "0" bit signal, said control means further operating to disconnect said second output lead of said separating means from said second input lead of said bistable means upon the occurrence of a "1" bit pulse of said first polarity succeeded by a "0" bit signal and to reconnect said second output lead of said separating means to said second input lead of said bistable means upon the next occurrence of a pulse of said second polarity succeeding said "0" bit signal.

said bistable means being responsive to said first and second polarity "1" bit pulses of said composite signal selectively coupled to the first and second input leads thereof for producing an output signal which alternates between said first and second signal levels in phase with the occurrence of said "1" bit pulses.

6. In a transmission system of the type wherein transmitted digital data is manifested by seriately occurring alternate first and second polarity data pulses, a receiver including first means responsive to said data pulses for producing an output signal having sharp pulses in phase with the peak values of said data pulses of said first polarity, second means responsive to said data pulses for producing an output signal having sharp pulses in phase with the peak values of said data pulses of said second polarity, and bistable means coupled to said first and second means for producing an output signal which alternates between a first and second level in response to said sharp pulses from said first and second means, said alternations of said output signal of said bistable means being representative of said digital data.

7. In a transmission system of the type wherein binary data is transmitted in the form of a signal wherein successive "1" bits are manifested by alternate first and second polarity pulses, a receiver including first means responsive to said transmitted signal for producing an output signal having sharp pulses in phase with the peak values of said data pulses of said first polarity, second means for producing an output signal having sharp pulses in phase with the peak values of said data pulses of said second polarity, and bistable means coupled to said first and second means for producing an alternating level output signal which exhibits a first signal level in response to said sharp pulses from said first means and which exhibits a second level in response to said sharp pulses from said second means, said alternations of said output signal of said bistable means being representative of said "1" bits of said transmitted binary data.

8. A transmission system according to claim 7 wherein said first means includes a first peak sensing circuit for producing a bi-phase output signal which exhibits a polarity change in phase with the peak values of said data pulses of said first polarity and means coupled to said first peak sensing circuit for producing sharp pulses in response to said polarity changes of said bi-phase signal therefrom, and wherein said second means includes a second peak sensing circuit for producing a bi-phase output signal which exhibits a polarity change in phase with the peak values of said data pulses of said second polarity and means coupled to said second peak sensing circuit for producing sharp pulses in response to said polarity changes of said bi-phase signal therefrom.

9. A transmission system according to claim 8 wherein said first and second peak sensing circuits are differentiating circuits and said means coupled thereto are zero crossing indication circuits.

10. A data transmission system comprising:

a source of digital data signals, said digital data being manifested by seriately occurring alternate polarity data pulses, means coupled to said source for delaying each of said data pulses a fixed time period, means coupled to said source for inverting each of said data pulses to form gating pulses, means for combining said delayed data pulses and said gating pulses to form a composite signal wherein each of said data pulses are preceded at said fixed time period by an opposite polarity pulse, means for transmitting said composite signal via a suitable transmission medium, means for receiving said transmitted composite signal, peak sensing means for producing sharp pulses in phase with the peak values of pulses applied thereto, switching means disposed between said receiving means and said peak sensing means for selectively coupling said composite signal to said peak sensing means at predetermined times, said peak sensing means producing sharp output pulses in phase with the peak values of the pulses of said composite signal selectively coupled thereto, and bistable means coupled to said peak sensing means for producing an output signal which alternates between a first and second signal level in response to said sharp pulses from said peak sensing means.

11. A data transmission system according to claim 10 wherein said bistable means includes first and second input leads, said output signal thereof changing levels in response to pulses alternately applied to said first and second input leads, wherein said switching means includes means responsive to said composite signal for separating the pulses thereof having a first plurality into a first channel and the pulses thereof having a second plurality into a second channel, and wherein said peak sensing means includes a first differentiating circuit coupled to said first channel and a first zero crossing indicator circuit coupling said first differentiating circuit to said first input lead of said bistable means, and a second differentiating circuit coupled to said second channel and a second zero crossing indicator circuit coupling said second differentiating circuit to said second input lead of said bistable means.

12. In a transmission system of the type wherein transmitted digital data is manifested by seriately occurring alternate first and second polarity data pulses, a receiver including means responsive to said data pulses for producing an output signal having sharp pulses in phase with the peak values of said data pulses, said responsive means including a peak sensing means, including a differentiating means and a zero crossing indicator means, and bistable means coupled to said responsive means for producing an output signal which alternates between a first and second level in response to said sharp pulses from said responsive means, said alterations of said output signal of said bistable means being representative of said digital data.

References Cited by the Examiner

UNITED STATES PATENTS

| | | | |
|---|---|---|---|
| 3,146,307 | 8/1964 | Renshaw | 325—320 X |
| 3,164,774 | 1/1965 | Fletcher | 328—55 X |

DAVID G. REDINBAUGH, *Primary Examiner.*

J. T. STRATMAN, *Assistant Examiner.*